United States Patent
McClellan et al.

(10) Patent No.: US 11,321,962 B2
(45) Date of Patent: *May 3, 2022

(54) AUTOMATED VENDING MACHINE WITH CUSTOMER AND IDENTIFICATION AUTHENTICATION

(71) Applicant: Accenture Global Solutions Limited, Dublin (IE)

(72) Inventors: Christopher J. McClellan, Grove City, OH (US); Jon C. Carder, Powell, OH (US); Kevin D. McCann, Lewis Center, OH (US); Benjamin Scott Rogers, Dublin, OH (US); Christopher Bryan Paul Barr, Gahanna, OH (US); Josef Salyer, Delaware, OH (US); Michael James Smith, Canal Winchester, OH (US); David W. Nippa, Dublin, OH (US)

(73) Assignee: Accenture Global Solutions Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 16/907,611

(22) Filed: Jun. 22, 2020

(65) Prior Publication Data
US 2020/0401792 A1  Dec. 24, 2020

Related U.S. Application Data

(63) Continuation of application No. 16/785,872, filed on Feb. 10, 2020, now Pat. No. 10,726,246.
(Continued)

(51) Int. Cl.
G06V 40/00   (2022.01)
G06V 40/16   (2022.01)
(Continued)

(52) U.S. Cl.
CPC ......... *G06V 40/173* (2022.01); *B67D 1/0022* (2013.01); *G06N 20/00* (2019.01);
(Continued)

(58) Field of Classification Search
CPC ............ G06Q 20/40145; G06Q 20/18; G06Q 20/206; G06Q 20/40; G06F 21/32; G06K 9/00221
See application file for complete search history.

(56) References Cited

U.S. PATENT DOCUMENTS 5,086,817 A  2/1992 Murphy
5,722,526 A  3/1998 Sharrard
(Continued)

FOREIGN PATENT DOCUMENTS

BR  102012017010  7/2013
CA  2782071  6/2020
(Continued)

OTHER PUBLICATIONS

EP Search Report in European Appln. No. 21157867.9, dated Jul. 19, 2021, 9 pages.
(Continued)

*Primary Examiner* — Li Liu
(74) *Attorney, Agent, or Firm* — Fish & Richardson P.C.

(57) ABSTRACT

Implementations include actions of receiving consumer-specific data and ID-specific data from an identification presented by a consumer to a vending machine, processing at least a portion of the ID-specific data to determine one or more of whether the identification is unexpired and whether the identification is authentic, and serving the consumer from the vending machine at least partially in response to determining that the identification is unexpired and that the identification is authentic and determining that the consumer is authentic relative to the identification.

17 Claims, 8 Drawing Sheets

Related U.S. Application Data

(60) Provisional application No. 62/865,420, filed on Jun. 24, 2019.

(51) Int. Cl.
  B67D 1/00 (2006.01)
  G06N 20/00 (2019.01)
  G07F 7/12 (2006.01)
  G06V 40/20 (2022.01)

(52) U.S. Cl.
  CPC ............ *G06V 40/166* (2022.01); *G06V 40/20* (2022.01); *G07F 7/12* (2013.01); *G06V 40/178* (2022.01)

(56) References Cited

U.S. PATENT DOCUMENTS

| | | | |
|---|---|---|---|
| 6,109,524 | A | 8/2000 | Kanoh et al. |
| 6,173,068 | B1 | 1/2001 | Prokoski |
| 6,711,465 | B2 | 3/2004 | Tomassi |
| 7,263,220 | B2 | 8/2007 | Crandall et al. |
| 7,529,411 | B2 | 5/2009 | Haupt et al. |
| 8,290,281 | B2 | 10/2012 | Xiao |
| 8,331,632 | B1 | 12/2012 | Mohanty et al. |
| 8,355,530 | B2 | 1/2013 | Park et al. |
| 8,582,835 | B2 | 11/2013 | Cavallini |
| 8,655,732 | B1 | 2/2014 | Wilinski et al. |
| 8,848,986 | B2 | 9/2014 | Cavallini |
| 8,958,607 | B2 | 2/2015 | Juveneton et al. |
| 9,076,030 | B2 | 7/2015 | Cavallini |
| 9,135,621 | B2 | 9/2015 | Fisher et al. |
| 9,154,727 | B2 | 10/2015 | Sato et al. |
| 9,202,121 | B2 | 12/2015 | Cavallini |
| 9,430,709 | B2 | 8/2016 | Juveneton et al. |
| 9,639,769 | B2 | 5/2017 | Juveneton et al. |
| 10,252,900 | B2 | 4/2019 | Cook |
| 10,726,246 | B1 | 7/2020 | McClellan et al. |
| 10,947,103 | B2 | 3/2021 | Gant et al. |
| 10,988,365 | B2 | 4/2021 | Gant et al. |
| 2002/0087413 | A1 | 7/2002 | Mahaffy et al. |
| 2002/0132663 | A1 | 9/2002 | Cumbers |
| 2002/0136435 | A1 | 9/2002 | Prokoski |
| 2003/0088333 | A1* | 5/2003 | Lift ............... G16H 40/67 700/237 |
| 2003/0150907 | A1* | 8/2003 | Metcalf ........... G06Q 20/4014 235/375 |
| 2003/0174868 | A1 | 9/2003 | Adachi et al. |
| 2004/0061796 | A1 | 4/2004 | Honda et al. |
| 2004/0069590 | A1 | 4/2004 | Corrick et al. |
| 2004/0170318 | A1 | 9/2004 | Crandall et al. |
| 2005/0004897 | A1 | 1/2005 | Lipson et al. |
| 2005/0018894 | A1 | 1/2005 | Couwenhoven et al. |
| 2006/0067573 | A1 | 3/2006 | Parr et al. |
| 2006/0157152 | A1 | 7/2006 | Wolski et al. |
| 2006/0204107 | A1 | 9/2006 | Dugan et al. |
| 2006/0274921 | A1 | 12/2006 | Rowe |
| 2007/0098303 | A1 | 5/2007 | Gallagher et al. |
| 2007/0127787 | A1 | 6/2007 | Castleman et al. |
| 2007/0239565 | A1 | 10/2007 | Pentel |
| 2008/0025576 | A1 | 1/2008 | Li et al. |
| 2008/0170129 | A1 | 7/2008 | Yi et al. |
| 2008/0212899 | A1 | 9/2008 | Gokturk et al. |
| 2008/0269947 | A1* | 10/2008 | Beane ............ G06Q 30/0607 700/237 |
| 2009/0060288 | A1 | 3/2009 | Myers et al. |
| 2009/0080715 | A1 | 3/2009 | van Beek et al. |
| 2009/0135188 | A1 | 5/2009 | Ding et al. |
| 2009/0136100 | A1 | 5/2009 | Shinohara |
| 2009/0210240 | A1 | 8/2009 | Benschop et al. |
| 2009/0219405 | A1 | 9/2009 | Kaneda et al. |
| 2009/0229699 | A1 | 9/2009 | Arcuri |
| 2010/0014720 | A1 | 1/2010 | Hoyos et al. |
| 2010/0078290 | A1 | 4/2010 | Chang |
| 2010/0138037 | A1* | 6/2010 | Adelberg ............ G07F 9/026 700/241 |
| 2010/0158319 | A1 | 6/2010 | Jung et al. |
| 2010/0249994 | A1* | 9/2010 | Sinclair ............... G07F 9/002 700/232 |
| 2010/0253801 | A1 | 10/2010 | Konishi |
| 2011/0074971 | A1 | 3/2011 | Kwon |
| 2011/0188712 | A1 | 8/2011 | Yoo et al. |
| 2011/0267259 | A1 | 11/2011 | Tidemand et al. |
| 2011/0298583 | A1 | 12/2011 | Libby et al. |
| 2011/0320037 | A1 | 12/2011 | Frugone |
| 2012/0002880 | A1 | 1/2012 | Lipson et al. |
| 2012/0075452 | A1 | 3/2012 | Ferren |
| 2012/0121193 | A1 | 5/2012 | Lipson et al. |
| 2012/0200689 | A1 | 8/2012 | Friedman et al. |
| 2012/0200729 | A1 | 8/2012 | Hoda et al. |
| 2013/0016882 | A1 | 1/2013 | Cavallini |
| 2013/0113941 | A1 | 5/2013 | Yoneyama |
| 2013/0215319 | A1 | 8/2013 | Tomita et al. |
| 2013/0242140 | A1 | 9/2013 | Uemura et al. |
| 2014/0037156 | A1 | 2/2014 | Cavallini |
| 2014/0093140 | A1 | 4/2014 | Juveneton et al. |
| 2014/0109023 | A1 | 4/2014 | Murillo et al. |
| 2014/0369611 | A1 | 12/2014 | Takeuchi |
| 2014/0376813 | A1 | 12/2014 | Hongu et al. |
| 2015/0003692 | A1 | 1/2015 | Cavallini |
| 2015/0139497 | A1 | 5/2015 | Juveneton et al. |
| 2015/0248764 | A1 | 9/2015 | Keskin et al. |
| 2015/0253845 | A1 | 9/2015 | Kempinski et al. |
| 2015/0310289 | A1 | 10/2015 | Cavallini |
| 2016/0098882 | A1 | 4/2016 | Holdych et al. |
| 2016/0155127 | A1 | 6/2016 | Hartman |
| 2016/0335515 | A1 | 11/2016 | Juveneton et al. |
| 2016/0379287 | A1 | 12/2016 | Dabiri |
| 2017/0092150 | A1 | 3/2017 | Aljahdali et al. |
| 2017/0277945 | A1 | 9/2017 | Budihal et al. |
| 2018/0029859 | A1 | 2/2018 | Hevia et al. |
| 2019/0050921 | A1 | 2/2019 | Ryner et al. |
| 2019/0206174 | A1 | 7/2019 | Miu et al. |
| 2019/0251562 | A1 | 8/2019 | Dabiri |
| 2019/0340418 | A1 | 11/2019 | Zecchini et al. |
| 2019/0377963 | A1 | 12/2019 | Hamid et al. |
| 2020/0327759 | A1* | 10/2020 | Neiman ............ G07C 9/00174 |
| 2020/0399111 | A1 | 12/2020 | Gant et al. |
| 2021/0002120 | A1 | 1/2021 | Gant et al. |
| 2021/0188613 | A1 | 6/2021 | Gant et al. |
| 2021/0264183 | A1 | 8/2021 | Wolf et al. |
| 2021/0264583 | A1 | 8/2021 | Wolf et al. |

FOREIGN PATENT DOCUMENTS

| | | |
|---|---|---|
| DE | 102014106249 | 11/2015 |
| EP | 1835440 | 9/2007 |
| EP | 1990770 | 11/2008 |
| EP | 2546782 | 6/2014 |
| EP | 2713307 | 5/2018 |
| EP | 3417429 | 12/2018 |
| EP | 3525134 | 8/2019 |
| GB | 2355054 | 4/2001 |
| JP | 2003221098 | 8/2003 |
| WO | WO 03033397 | 4/2003 |
| WO | WO 2006023046 | 3/2006 |
| WO | WO 2007076584 | 7/2007 |
| WO | WO 2017098289 | 6/2017 |
| WO | WO 2018236758 | 12/2018 |
| WO | WO 2019056579 | 3/2019 |

OTHER PUBLICATIONS

EP Search Report in European Appln. No. 21157939.6, dated Jul. 13, 2021, 12 pages.

Mantecon et al., "Depth-based face recognition using local quantized patterns adapted for range data," 2014 IEEE International Conference on Image Processing, Paris, France, Oct. 27-30, 2014, 293-297.

Aai et al., "Comparative Study on Blink Detection and Gaze Estimation Methods for HCI, in Particular, Gabor Filter Utilized

(56) References Cited

OTHER PUBLICATIONS

Blink Detection Method," 2011 Eighth International Conference on Information Technology: New Generations, Las Vegas, NV, Apr. 11-13, 2011, 441-446.
Bai et al., "Is Physics-based Liveness Detection Truly Possible with a Single Image?" IEEE International Symposium on Circuits and Systems, Paris, France, May 30-Jun. 2, 2010, 3425-3428.
Kollreider et al., "Verifying Liveness by Multiple Experts in Face Biometrics," IEEE Computer Society Conference on Computer Vision and Pattern Recognition Workshops, Anchorage, AK, Jun. 23-28, 2008, 6 pages.
Li et al., "Live Face Detection Based on the Analysis of Fourier Spectra," Proceedings of SPIE 5404: Biometric Technology for Human Identification, Orlando, FL, Apr. 12-16, 2004, 296-303.
Martin, "La fusion d'informations," Polycopie de cours ENSIETA—Ref.: 1484, Jan. 2005, 120 pages (with verified partial English translation).
Schwartz et al., "Face Spoofing Detection through Partial Least Squares and Low-Level Descriptors," IEEE International Joint Conference on Biometrics, Washington, DC, Oct. 11-13, 2011, 8 pages.
Shafait et al., "Real Time Lip Motion Analysis for a Person Authentication System Using Near Infrared Illumination," IEEE International Conference on Image Processing, Atlanta, GA, Oct. 8-11, 2006, 1957-1960.
Tan et al., "Face Liveness Detection from a Single Image with Sparse Low Rank Bilinear Discriminative Model," 11th European Conference on Computer Vision, Heraklion, Crete, Greece, Sep. 5-11, 2010, 6:504-517.
Zhang et al., "Face Liveness Detection by Learning Multispectral Reflectance Distributions," IEEE International Conference on Automatic Face & Gesture Recognition, Santa Barbara, CA, Mar. 21-25, 2011, 436-441.
Scott [online], "Buying Draft Beer from a Vending Machine in Japan", Youtube, May 17, 2013, retrieved on Jan. 27, 2020, <https://www.youtube.com/watch?v=JNLW5vgKNw8>, 1 page [Video Submission].
AU Office Action in Australian Appln. No. 2020204204, dated Aug. 4, 2021, 4 pages.
AU Office Action in Australian Appln. No. 2020204186, dated Jun. 7, 2021, 3 pages.
EP Search Report in European Appln. No. 20175201.1, dated Oct. 26, 2020, 8 pages.
AU Office Action in Australian Appln. No. 2020204186, dated Jul. 28, 2020, 11 pages.
AU Office Action in Australian Appln. No. 2020204204, dated Aug. 24, 2020, 9 pages.

\* cited by examiner

AUTOMATED VENDING MACHINE WITH CUSTOMER AND IDENTIFICATION AUTHENTICATION

CROSS-REFERENCE TO RELATED APPLICATIONS

This application is a continuation U.S. Ser. No. 16/785,872, filed on Feb. 10, 2020, and entitled AUTOMATED VENDING MACHINE WITH CUSTOMER AND IDENTIFICATION AUTHENTICATION, which claims the benefit of and priority to U.S. 62/865,420, filed on Jun. 24, 2019, and entitled AUTOMATED VENDING MACHINE WITH CUSTOMER AND IDENTIFICATION AUTHENTICATION, the disclosure of which are expressly incorporated herein by reference in their entirety.

BACKGROUND

Vending machines enable provisioning of goods and/or services to customers. In some instances, goods and/or services requested by customers can be restricted. For example, a customer may be required to be of a minimum age and/or have appropriate licensing, credentials, or other approval (e.g., prescription) to obtain particular goods and/or services. Using alcohol as a non-limiting example, a customer may be required to be at least 21 years of age to purchase and consume alcoholic beverages. Using tobacco as another non-limiting example, a customer may be required to be at least 18 years of age to purchase tobacco products. Using rental vehicles as still another non-limiting example, access to a rental vehicle can be limited to customers having a valid driver license and being of at least a certain age (e.g., 18 years old, 24 years old).

While vending machines provide numerous advantages, provisioning of restricted goods and/or services requires particular functionality in order to be fully-automated. For example, the vending machine itself is required to authenticate documentation provided by the customer (e.g., license, identification, prescription) as well as the customer (e.g., verify that the customer requesting the goods/services matches the person associated with the documentation). Although systems have been developed to perform such functionality, traditional systems can suffer from disadvantages. Example disadvantages is inconsistently discerning between authentic documentation and forged documentation, and not accurately determining that the customer requesting the goods/services matches the person associated with the documentation.

SUMMARY

Implementations of the present disclosure are generally directed to vending machines. More particularly, implementations of the present disclosure are directed to a vending machine that verifies characteristics (e.g., an age of a customer, an identity of a customer) before dispensing a product.

In some implementations, actions include receiving consumer-specific data and ID-specific data from an identification presented by a consumer to a vending machine, processing at least a portion of the ID-specific data to determine one or more of whether the identification is unexpired and whether the identification is authentic, and serving the consumer from the vending machine at least partially in response to determining that the identification is unexpired and that the identification is authentic and determining that the consumer is authentic relative to the identification. Other implementations of this aspect include corresponding systems, apparatus, and computer programs, configured to perform the actions of the methods, encoded on computer storage devices.

These and other implementations can each optionally include one or more of the following features: determining whether the identification is authentic includes comparing features of the identification to known features of a type of the identification; determining whether the identification is authentic includes providing an image of the identification to a machine learning (ML) model and receiving an indication from the ML model indicating whether the identification is authentic; determining whether the consumer is authentic relative to the identification includes providing image data and/or video data depicting the consumer and an image from the identification to a facial recognition system that processes the data to determine whether the consumer matches the image provided with the identification; actions further include determining a state of the consumer, serving the consumer being further in response to the state of the user; the state includes sober; actions further include determining that a person is physically present at the vending machine, serving the consumer being further in response to determining that a person is physically present at the vending machine; and determining that a person is physically present is at least partially based on a depth determined using one or more images generated by at least one camera of the vending machine.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Implementations of the present disclosure are generally directed to vending machines. More particularly, implementations of the present disclosure are directed to a vending machine that verifies characteristics of a customer (e.g., an age of a customer, an identity of a customer) before dispensing a product. Implementations include actions of receiving consumer-specific data and ID-specific data from an identification presented by a consumer to a vending machine, processing at least a portion of the ID-specific data to determine one or more of whether the identification is unexpired and whether the identification is authentic, and serving the consumer from the vending machine at least partially in response to determining that the identification is unexpired and that the identification is authentic and determining that the consumer is authentic relative to the identification.

Implementations of the present disclosure are described in further detail herein with reference to an example vending machine. The example vending machine includes a vending machine that dispenses restricted products (e.g., age restricted). In the example described herein, the vending machine is a beverage vending machine that dispenses alcoholic beverages (e.g., beverages restricted to persons aged 21 and above). It is contemplated, however, that implementations of the present disclosure can be realized with any appropriate vending machines that dispense restricted goods and/or services. For example, and without limitation, vending machines in accordance with implementations of the present disclosure can be used to provision rental cars, cannabis, ammunition, medications, airline tickets, utility services, and the like to persons. Further, implementations of the present disclosure can be realized based on any appropriate restriction. For example, implementations of the present disclosure are described herein with reference to age restriction. Other example restrictions can include, without limitation, licensing restriction (e.g., consumer must have and present valid license relevant to particular goods/services), and prescription (e.g., consumer must have and present a valid prescription from a licensed healthcare practitioner).

Figure 1A:
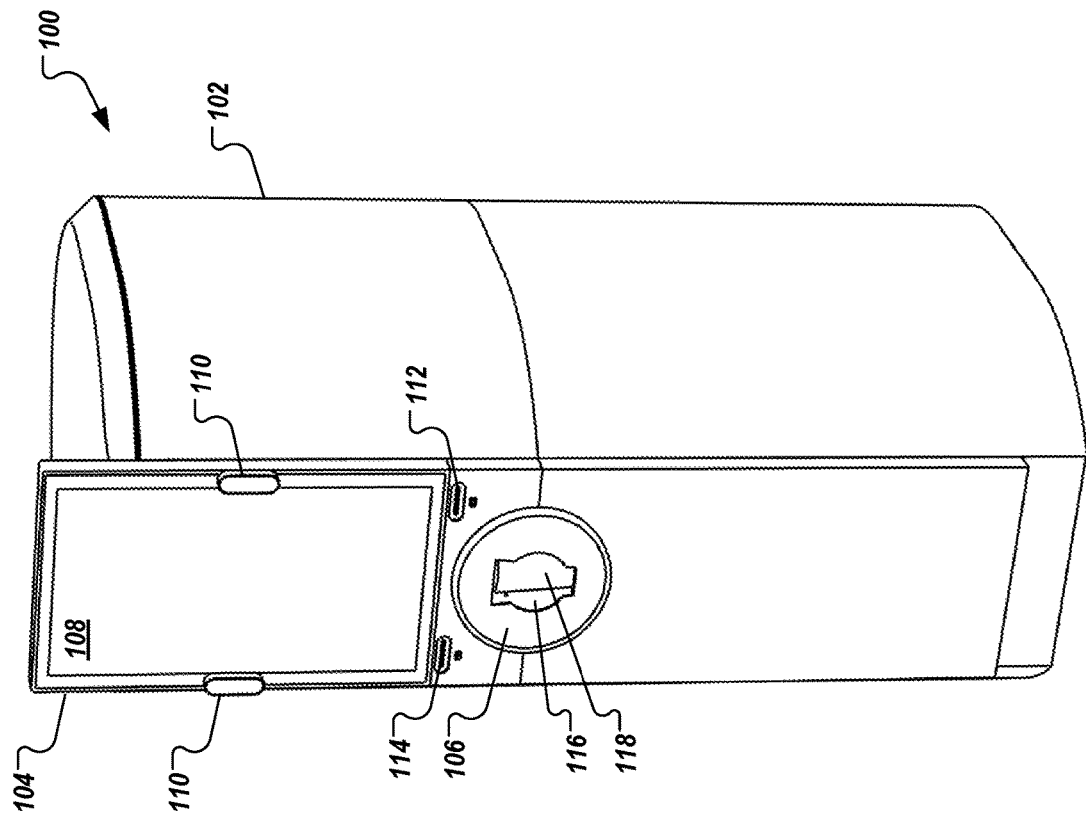
FIGS. 1A and 1B depict a beverage vending machine in accordance with implementations of the present disclosure.
Figure 1B:
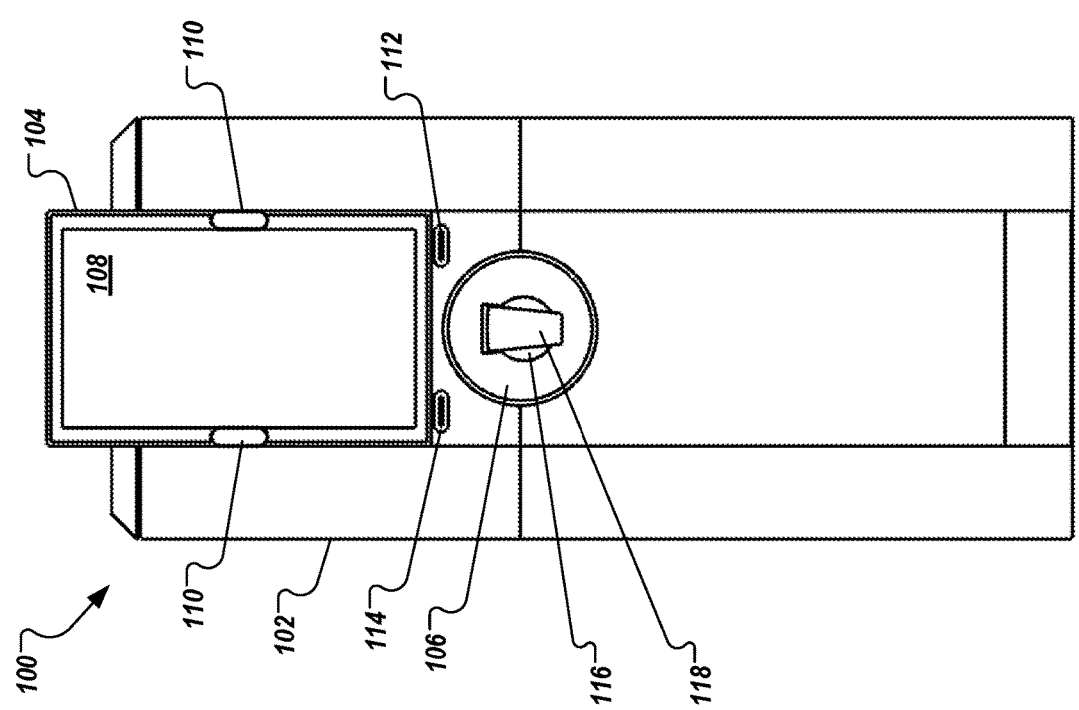

FIGS. 1A and 1B depict a beverage vending machine 100 in accordance with implementations of the present disclosure. The vending machine 100 includes a housing 102, an interface 104, and a beverage dispenser 106. As described in further detail herein, the housing 102 houses devices, systems, and beverages that can be dispensed to consumers through the beverage dispenser. For example, the housing 102 can house, without limitation, one or more computing devices, a refrigeration system, one or more beverage reservoirs (e.g., kegs, boxes, bottles), and a beverage dispensing system (e.g., lines, taps, pressure source).

In the example of FIGS. 1A and 1B, the interface 104 includes a display screen 108 and one or more cameras 110. In some implementations, the display screen 108 displays one or more user interfaces (UIs) that enable a consumer to interact with the vending machine 100. In some examples, the display screen 108 is provided as a touchscreen that displays one or more UIs and that is responsive to user input (e.g., the consumer touching the display screen 108). In this manner, the consumer can provide touch input to the vending machine 100 through the display screen 108 to, among other things, make a selection, input information, and review beverage options. In some examples, each of the one or more cameras 110 is a digital camera that generates digital images. Although multiple cameras 110 are depicted in the example of FIGS. 1A and 1B, implementations of the vending machine 100 can be realized with a single camera 110. In some examples, a camera 110 can include, without limitation, a still camera, a video camera, an infra-red (IR) camera, or any appropriate camera. In some examples, the single camera 110 includes combined capabilities (e.g., combined still, video, and IR camera). In some examples, multiple cameras 110 are provided. For example, a first camera 110 can include first capabilities (e.g., still, video), and a second camera 110 can include second capabilities (e.g., IR). In some examples, data generated using multiple cameras can be used to provide stereoscopic imaging and/or video (e.g., multi-dimensional).

Although not depicted in FIGS. 1A and 1B, the vending machine 100 can include one or more microphones for generating audio data. In some examples, the interface 104 can include one or more microphones. For example, at least one camera 110 of the one or more cameras 110 can include a microphone.

In the example of FIGS. 1A and 1B, the vending machine 100 includes an identification (ID) scanner 112 and a card reader 114. In some examples, the ID scanner 112 scans a form of identification (e.g., a residence card, a driver's license, a passport) that records consumer-specific information. Example consumer-specific information can include, without limitation, one or more identification images (e.g., facial image, fingerprint image), name, address, date-of-birth (DOB), age, address, unique identifier (e.g., resident number, license number, passport number), and gender. In some examples, the identification records the consumer-specific information in analog form (e.g., printed on the identification) and/or digital form (e.g., digitally recorded in memory on the identification). In some examples, the ID scanner 112 scans the identification to determine at least a portion of the consumer-specific information. For example, the ID scanner 112 can record an image of the identification and can process the image (e.g., using optical character recognition, and/or image recognition) to determine one or more of the identification image(s), the name, the address, the DOB, the age, the address, the unique identifier, and the gender recorded on the identification. As another example, the ID scanner 112 can read a memory of the identification to retrieve one or more of the identification image(s), the name, the address, the DOB, the age, the address, the unique identifier, and the gender recorded on the identification.

In some examples, the card reader 114 reads payment information to remit payment for a beverage that is to be served by the vending machine 100. In some examples, the card reader 114 is a traditional card reader that ingests a payment card (e.g., credit card, debit card, gift card) having payment information recorded thereon. Payment is facilitated as described in further detail herein. Although a card reader 114 is provided, it is contemplated that the vending machine 100 can use any appropriate payment technique. Example payment techniques include, without limitation, card payment (e.g., credit card, debit card, gift card), near-field communication (NFC) payment (e.g., touch-to-pay), and machine-readable code payment (e.g., bar code, QR code scanning). In some examples, the vending machine 100 enables consumers to select a payment technique from a set of payment techniques. In some examples, the card reader 114 is not included in the vending machine 100 (e.g., the vending machine 100 accepts only non-card payments (e.g., NFC payment, machine-readable code payment). In some examples, the vending machine 100 enables use of government issued currency and/or currency representation (e.g., tokens, coupons) as payment options.

In the example of FIGS. 1A and 1B, the beverage dispenser 106 includes an opening 116 for receiving a vessel 118. In some examples, the opening 106 enables access to one or more taps that dispense a beverage into the vessel 118. In the depicted example, the vessel 118 is provided as a glass. It is contemplated, however, that any appropriate vessel can be used for receiving a dispensed beverage.

Figure 2A:
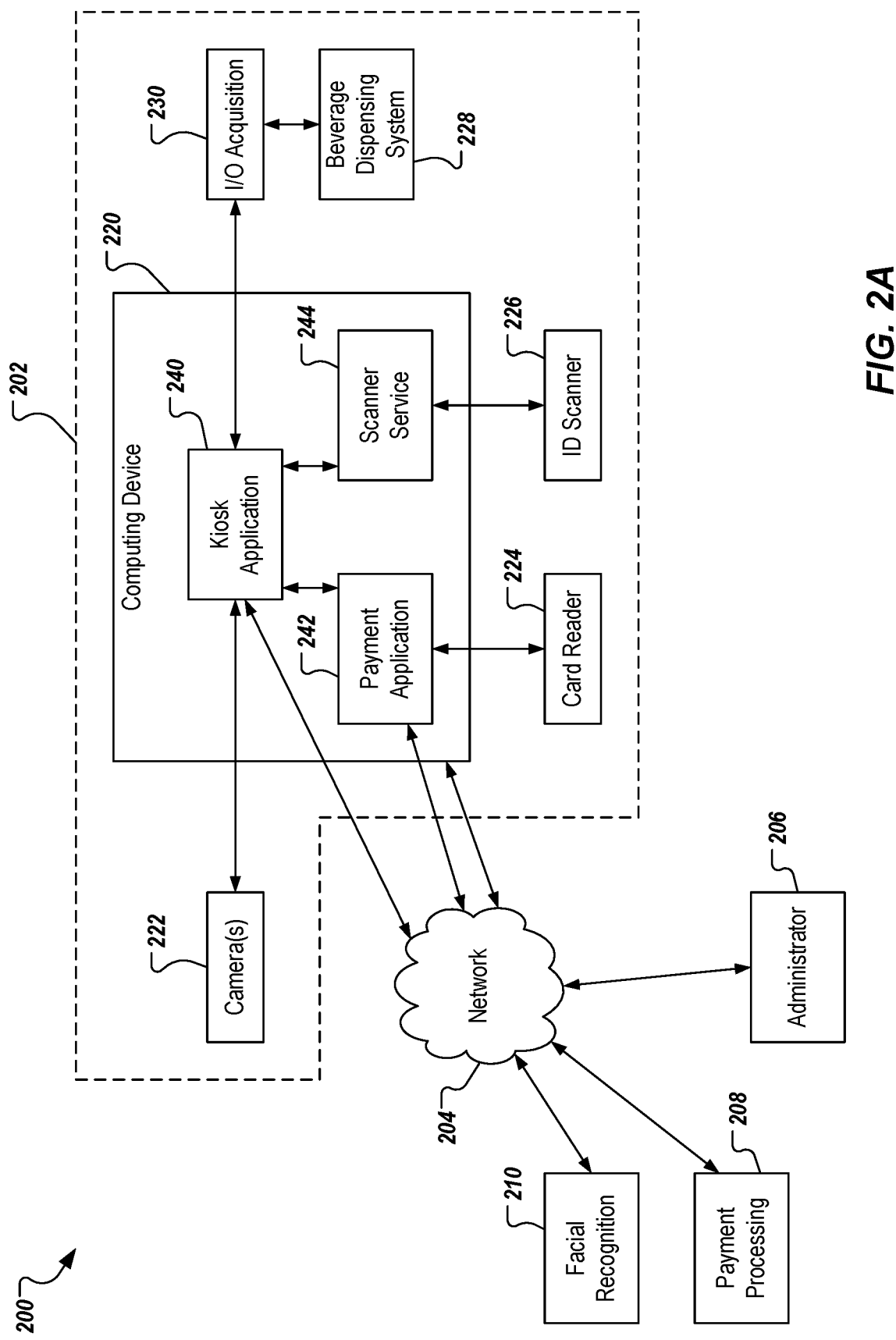
FIGS. 2A and 2B depict example architectures in accordance with implementations of the present disclosure.

FIG. 2A depicts an example architecture 200 in accordance with implementations of the present disclosure. The example architecture 200 includes a vending machine 202 (e.g., the vending machine 100 of FIGS. 1A and 1B), a network 204, an administrator system 206, a payment processing system 208, and a facial recognition system 210. In some examples, the network 204 is provided as a large computer network, such as a local area network (LAN), a wide area network (WAN), the Internet, a cellular network, a telephone network (e.g., PSTN) or an appropriate combination thereof connecting any number of vending machines 202, communication devices, mobile computing devices, fixed computing devices and server systems.

In some examples, each of the administrator system 206, the payment processing system 208, and the facial recognition system 210 is hosted on one or more servers and are accessible by the vending machine 202 over the network 204. In some examples, the administrator system 206 is operated by or on behalf of the enterprise that operates the vending machine 202. For example, the enterprise 206 can remotely interact with the vending machine 202 through the administrator system 206 to perform one or more functionalities of a plurality of functionalities (e.g., update software, set configuration parameters, perform diagnostics, receive sales data, receive consumption data), as described in further detail herein. In some examples, the payment processing system 208 is operated by a third-party payment processing service, as described in further detail herein. In some examples, the facial recognition system 210 is operated by a third-party facial recognition service, as described in further detail herein.

In the example of FIG. 2A, the vending machine 202 includes a computing device 220, one or more cameras 222 (e.g., the cameras 110 of FIG. 1), a card reader 224 (e.g., the card reader 114 of FIG. 1), an ID scanner 226 (e.g., the ID scanner 112 of FIG. 1), a beverage dispensing system 228, and in input/output (I/O) acquisition system 230 (e.g., Lab-Jack T7).

In some examples, the computing device 220 includes any appropriate type of computing device such as, and without limitation, a desktop computer, a laptop computer, a handheld computer, and a tablet computer. For example, the computing device 220 can be provided as an industrial personal computer (PC) that executes an operating system (e.g., Windows 10 provided by Microsoft Corp.). The computing device 220 executes a kiosk application 240, a payment application 242, and a scanner service 244. In some examples, each of the kiosk application 240, the payment application 242, and the scanner service 244 is provided as one or more computer-executable programs executed by the computing device 220. In some examples, the computing device 220 is in communication (e.g., wired, wireless) with the one or more cameras 222 to receive image data and/or audio data (e.g., the kiosk application 240 ingests at least a portion of image data and/or audio data provided from the one or more cameras).

In some examples, the computing device 220 is in communication (e.g., wired, wireless) with the beverage dispensing system 228. In the depicted example, the computing device 220 is in communication with the beverage dispensing system 228 through the I/O acquisition system 230. In some examples, the kiosk application 240 issues commands to and/or receives data from the beverage dispensing system 228. For example, the kiosk application 240 can issue commands to the beverage dispensing system 228 to dispense a particular beverage selected by a consumer. As another example, the kiosk application 240 can receive data from the beverage dispensing system 228, the data indicating a status of the beverage dispensing system 228 and/or one or more beverages within the vending machine 202. Example data can include, without limitation, beverage quantity, beverage temperature, hardware faults, software faults.

In some examples, the computing device 220 is in communication (e.g., wired, wireless) with each of the card reader 224 and the ID scanner. In some examples, the card reader 224 reads payment information (e.g., from a credit/debit/gift card) and provides the payment information to the payment application. In some examples, the payment application 242 provides at least a portion of the payment information to the payment processing system 208, which processes the at least a portion of the payment information to provide a payment approval or payment denial decision (e.g., the payment submitted by the consumer has been approved/denied). In some examples, the payment application 242 receives the payment decision from the payment processing system 208 and provides the payment decision to the kiosk application 240, which determines whether to serve a beverage to the consumer at least partially based on the payment decision (e.g., if the payment is approved and the consumer is authenticated and is of the required age, serve the beverage; if the payment is approved, but the consumer is either not authenticated or is not of the required age, do not serve the beverage; if the payment is not approved, do not serve the beverage).

In some examples, the ID scanner 226 scans an identification presented by a consumer to determine at least a portion of the consumer-specific information. For example, the ID scanner 226 can record an image of the identification and can process the image (e.g., using optical character recognition, and/or image recognition) to determine one or more of the identification image(s), the name, the address, the DOB, the age, the address, the unique identifier, and the gender recorded on the identification. As another example, the ID scanner 226 can read a memory of the identification to retrieve one or more of the identification image(s), the name, the address, the DOB, the age, the address, the unique identifier, and the gender recorded on the identification.

In some implementations, the ID scanner 226 reads a barcode (and/or QR code), magnetic strip, and takes full front and back images of the identification for OCR. In some examples, the scanner service 244 validates the identification by cross-referencing the data and checking for security. In some implementations, the kiosk application 240 reads only the information necessary to check the results of the ID validation, validate the consumer's DOB, and first name for a personalized experience (e.g., display the user's name in the UI). In some examples, no personally identifiable information (PII) is stored in the vending machine 202. In some examples, the only personal consumer information that is transmitted from the vending machine 202 is the image from the identification and the image, video, and/or audio that is captured by the vending machine 202 (e.g., sent to the facial recognition service 210). However, this data is not persisted at either the vending machine 202 or by the facial recognition service 210.

In some implementations, and as described in further detail herein, the kiosk application 240 receives data representative of a consumer requesting beverage service and determines whether to serve the consumer at least partially based on the data. In some implementations, the kiosk application 240 receives at least a portion of the consumer-specific data provided from the identification, as described herein. Example consumer-specific information can include, without limitation, image data (e.g., picture provide with the identification), gender, height, age, name, and address. In some examples, the kiosk application 204 receives at least a portion of ID-specific data provided for the identification. Example ID-specific data can include, without limitation, one or more patterns, an expiration date, and one or more watermarks (e.g., visible, invisible, ultra-violet (UV)). In some examples, the kiosk application 240 receives current consumer data representative of the consumer, who is present at the vending machine 202 and is requesting service. Example current consumer data can include, without limitation, image data, video data, and audio data (e.g., provided from the one or more cameras 222).

In accordance with implementations of the present disclosure, the kiosk application 240 determines whether the identification is expired. In some examples, determining whether the identification is expired can be executed by processing at least a portion of the ID-specific data. For example, the kiosk application 240 can compare an expiration date of the identification to a current date to determine whether the identification has expired. If the identification is expired, no further processing is required, as it can be determined that the consumer cannot be served without an unexpired identification. If the identification is not expired, further processing can be performed to determine whether the consumer can be served.

In some implementations, the kiosk application 240 determines whether the age indicated on the identification is of a legal age for consumption of the beverage. For example, the kiosk application 240 can compare the age indicated on the identification (e.g., by comparing a current date to the DOB provided on the identification) to a legal age (e.g., a statutorily-defined legal age for the particular location). If the age is not of the legal age, no further processing is required, as it can be determined that the consumer cannot be served. If the age is of the legal age, further processing can be performed to determine whether the consumer can be served.

In some implementations, the kiosk application 240 determines whether the presented identification is authentic. That is, the kiosk application 240 determines whether the identification is real, a forgery, or damaged such that authenticity cannot be determined. If it is determined that the identification is not authentic, no further processing is required, as it can be determined that the consumer cannot be served without an authentic identification. If it is determined that the identification is authentic, further processing can be performed to determine whether the consumer can be served.

In some examples, the kiosk application 240 can process at least a portion of the ID-specific data to determine whether the identification is authentic. In some examples, features of the presented identification can be compared to known features of the particular type of identification. Example features can include, without limitation, one or more patterns, one or more watermarks, one or more images, and locations of each on the identification. Example features can also include, without limitation, locations and/or format of text depicted on the identification.

In some examples, features of the presented identification can be compared to known features based on a set of rules, each rule defining whether a feature conforms to a respective known feature. In some examples, multiple sets of rules can be provided, each rule corresponding to a respective type (e.g., residence card, driver's license, passport) and/or issuing authority (e.g., city, state, national government) of the identification. For example, it can be determined that the identification is a driver's license from the State of Texas (e.g., text on the license can be processed using optical character recognition (OCR) to determine a type of identification and the issuing authority; an image of the identification can be processed through a machine learning (ML) model that is trained to classify identifications into types and/or issuing authorities based on images of the identifications; that is, the ML model outputs a type and an authority). In response to determining that the identification is a driver's license from the State of Texas, a set of rules corresponding to Texas driver's licenses can be used.

In some examples, the image of the identification can be processed through a ML model that is trained to classify identifications as authentic or as inauthentic. For example, the ML model can be trained based on known, authentic identifications to be able to discern between inauthentic identifications and authentic identifications. In some examples, the ML model outputs one or more classifications, each classification having a confidence score. For example, the ML model can output a classification of authentic with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the identification is, in the example above, determined to be authentic. If the classification is determined to be incorrect, the identification is, in the example above, determined to be inauthentic.

In some implementations, at least a portion of the current consumer data can be processed to determine whether the consumer, who presented the identification is authentic. That is, it is determined whether the consumer, who presented the identification is the person represented by the identification (e.g., to determine whether the consumer is using someone else's identification). For example, current consumer data can include image data and/or video data depicting the consumer that is present at the vending machine 202. In some examples, the image data and/or the video data can be processed to determine whether the consumer matches the image provided with the identification. For example, the image data and/or the video data, and the image from the identification can be provided to the facial recognition system 210, which can process the data to determine whether the consumer matches the image provided with the identification. If the consumer does not match the image provided from the identification, it can be determined that the consumer is not authentic and cannot be served. If the consumer does match the image provided from the identification, it can be determined that the consumer is authentic and can be served.

For example, the facial recognition system 210 can employ one or more facial recognition models (e.g., ML models) that can compare images to determine whether faces depicted in the images match. In some examples, the facial recognition system 210 receives the image from the identification and the image from the vending machine, each image depicting a face. The facial recognition system 210 processes the images to determine whether the faces are the same. For example, a ML model can process the images and outputs one or more classifications, each classification having a confidence score. For example, the ML model can output a classification of match with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the faces depicted in the images, in the example above, are determined to match. If the classification is determined to be incorrect, the faces depicted in the images, in the example above, are determined to not match.

In some implementations, the image data and/or the video data can be processed to determine demographic features of the consumer. Example demographic features can include, without limitation, age, gender, and height. For example, the image data and/or the video data can be provided to a demographic feature system, which can process the data to determine demographic features of the consumer. In some examples, the demographic features can be compared to respective demographic features of the consumer-specific information provided from the identification. In some examples, if at least a portion of the demographic features of the consumer do not match the respective demographic features of the consumer-specific information provided from the identification, and/or the consumer does not match the image provided from the identification, it can be determined that the consumer is not authentic and cannot be served.

For example, the demographic feature system (e.g., which can be a system also provided with the facial recognition system 210) can employ one or more demographic feature recognition models (e.g., ML models) that can analyze images to determine demographic features of a person depicted therein. In some examples, the demographic feature system receives the image from the vending machine (an image generated by the vending machine) and processes the image to determine one or more demographic features. For example, a ML model can process the image and outputs one or more classifications, each classification having a confidence score. For example, the ML model can output a classification of an age with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the demographic feature (e.g., age) determined from the image, in the example above, is determined to be correct. If the classification is determined to be incorrect, the demographic feature (e.g., age) determined from the image, in the example above, is determined to be incorrect.

In some implementations, one or more other conditions can be evaluated to determine whether the consumer is to be served. Example other conditions can include, without limitation, a service history for the consumer, a state of the user, venue constraints, and legal constraints.

In some examples, the service history for the consumer includes a history of beverages served to the user within a particular time period. For example, if the consumer has been served a threshold number of beverages (e.g., X beverages) within a threshold time period (e.g., Y minutes), it can be determined that the user is not to be served. In this manner, over-serving of the consumer can be avoided, and/or the consumer purchasing beverages for others can be mitigated.

In some implementations, the service history is determined based on data provided from the vending machine 202. That is, for each consumer, the vending machine 202 can record each transaction (e.g., each time the consumer purchases a beverage). In some examples, a transaction record is provided that includes a time, a date, a location (e.g., unique identifier of the vending machine 202), a beverage purchased, and the like. In some examples, a consumer record can be provided that includes a set of transaction records.

In some implementations, the service history is determined at least partially based on data provided from other vending machines 202. For example, a set of vending machines 202 can be located within a facility (e.g., a stadium), and consumers can purchase beverages from multiple vending machines 202. In some examples, a consumer record includes transactions from any vending machine 202 within the facility. In some examples, the consumer records can be stored on each of the vending machines 202. In some examples, the consumer records can be stored in a central repository that each vending machine 202 can access to determine whether a particular consumer is to be served.

In some implementations, the service history is determined at least partially based on additional data representative of transactions. In some examples, the additional data can represent transactions that occurred remotely from (or otherwise external to) the facility, at which the vending machine 202 is located. For example, the computing device 220 can receive additional data indicating that the consumer purchased alcoholic one or more alcoholic beverages at a bar and/or restaurant prior to a currently requested purchase at the vending machine 202.

In some implementations, a state of the consumer can be determined and can be compared to one or more known states. In some examples, the state of the consumer can represent a behavior of the consumer at the vending machine. For example, image data and/or video data can be processed to determine one or more characteristics that are representative of a state of the consumer. Example characteristics can include, without limitation, bloodshot eyes, slurred speech, motion, and the like. In some examples, the one or more characteristics can be determined for the consumer and can be used to provide a consumer profile. In some examples, the consumer profile is evaluated to determine a state of the user. Example states can include, without limitation, sober, tipsy, drunk. In some examples, service can be denied based on state. For example, if it is determined that the state of the consumer is drunk, service to the consumer can be declined.

For example, a state recognition system (e.g., which can be a system also provided with the facial recognition system 210) can employ one or more state recognition models (e.g., ML models) that can analyze images, video, and/or audio to determine a state of a person depicted therein. In some examples, the state recognition system receives the images, video, and/or audio from the vending machine (as generated by the vending machine) and processes the images, video, and/or audio to determine one or more states. For example, a ML model can process the image and outputs one or more classifications, each classification having a confidence score. For example, the ML model can output a classification of a state—sober with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the state (e.g., sober) determined from the images, video, and/or audio, in the example above, is determined to be correct. If the classification is determined to be incorrect, the state (e.g., sober) determined from the images, video, and/or audio, in the example above, is determined to be incorrect.

As another example, a number of times that the consumer has been served within a period of time (e.g., determined from the service history) can be used to determine a state of the user. For example, a blood-alcohol content (BAC) value can be calculated based on the gender, weight (e.g., data available to us from their ID document scan) and the number and types of beverages served. The BAC value can be compared to a threshold BAC value. If the BAC value exceeds the threshold BAC value, service can be denied.

In some implementations, one or more venue constraints, one or more legal constraints, and one or more schedule constraints can be evaluated to determine whether consumers are to be served. An example venue constraint can include, without limitation, a time period during which the venue is offering beverages for sale. In some examples, if a consumer requests a beverage outside of the time period, it can be determined that service of the beverage is to be declined. An example legal constraint can include, without limitation, a time period during which sale of beverages are legally prohibited. In some examples, if a consumer requests a beverage during the time period, it can be determined that service of the beverage is to be declined. An example schedule constraint can include, without limitation, a time period during which an event is occurring (e.g., a collegiate athletic event, a religious ceremony), and sales of beverages are legally and/or contractually prohibited. In some examples, if a consumer requests a beverage during the time period, it can be determined that service of the beverage is to be declined.

Figure 2B:
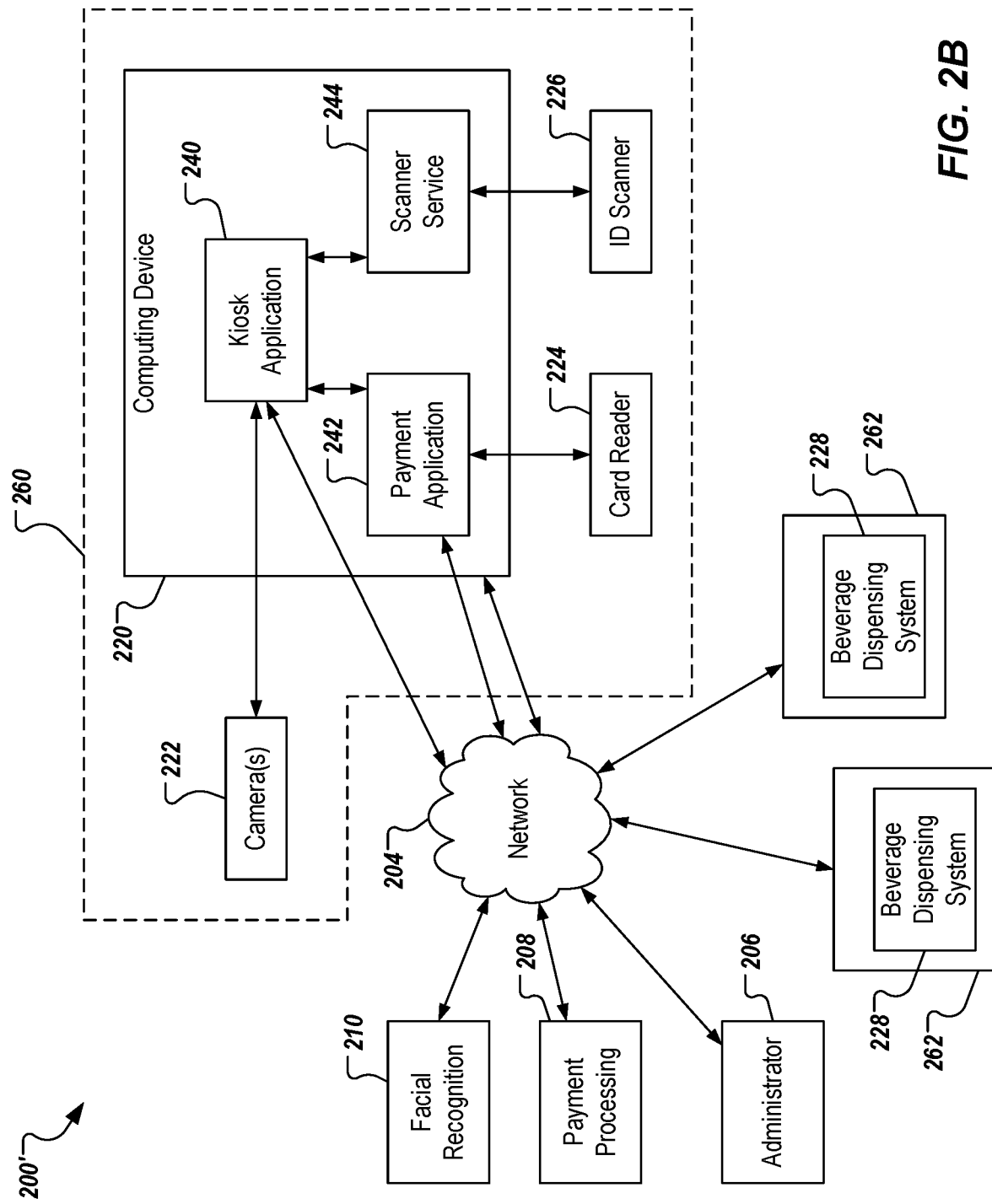

With reference to FIG. 2B, another example architecture 200' is provided, in which verification of characteristics of a customer (e.g., an age of a customer, an identity of a customer) is performed at a first location, and retrieval of a good/service is performed at a second location. In the example of FIG. 2B, a point-of-verification device 260 is provided, which includes components of the vending machine 202 except for the beverage dispensing system 228, and the I/O acquisition system 230. Instead, in the example architecture 200' of FIG. 2B, one or more beverages dispensing systems 228 are provided as components of respective dispensing systems 262. In some examples, the point-of-verification device 260 is at a first location and executes verification of characteristics of a customer, as described herein. In some examples, payment can be made at the first location using the point-of-verification device 260.

After verification (e.g., age and identity of the customer have been verified), the customer can retrieve from one of the dispensing systems 262, each located at respective second locations. In some examples, the point-of-verification device 260 informs the customer as to the specific dispensing system 262 that is to be used (e.g., Pick-up your beverage at Machine No. 456). This can occur when, for example, a particular good is only available at one or more particular dispensing systems 262 (e.g., Machine 123 dispenses lagers, Machine 456 dispenses stouts, Machine 789 dispenses wheat beers). In some examples, the customer can select any dispensing system 262 of multiple dispensing systems 262.

In some implementations, the dispensing system 262 dispenses the good (e.g., beverage) in response to verifying the identity of the customer at the dispensing machine 262. For example, the dispensing machine 262 can include one or more cameras (not depicted) that capture an image of the customer. In some examples, the image of the customer captured by the dispensing machine 262 can be compared to one or more images provided through the point-of-verification device 260 to confirm that the customer attempting to retrieve the good at the dispensing machine 262 had been verified at the point-of-verification device. In some examples, the dispensing system 262 can provide the images that are to be compared to the facial recognition system 210, which can employ one or more facial recognition models (e.g., ML models) that can compare images to determine whether faces depicted in the images match, as described herein. In the case where the In some examples, in the case where the point-of-verification device 260 informs the customer as to the specific dispensing system 262 that is to be used, the point-of-verification device 260 can provide a transaction record including an image of the customer to the specific dispensing system 262. In this manner, the identity of the customer can be verified for retrieval of the good at the dispensing system 262 based on the image provided in the transaction record and the image captured by the dispensing system 262. In some examples, in the case where the point-of-verification device 260 informs the customer as to the specific dispensing system 262 that is to be used, the image captured by the dispensing system 262 is provided to the point-of-verification device 260, which provides a confirmation as to whether the good should be provided to the customer. For example, the point-of-verification device 260 can determine (e.g., using the facial recognition system) whether the customer attempting to retrieve the good is the customer that was verified at the point-of-verification device 260.

In some examples, in the case where, the customer can select any dispensing system 262 of multiple dispensing systems 262, the point-of-verification device 260 can provide a transaction record including an image of the customer to each of the dispensing systems 262. In this manner, the identity of the customer can be verified for retrieval of the good at the dispensing system 262 based on the image provided in the transaction record and the image captured by the dispensing system 262 the customer chooses to use. In some examples, in the case where, the customer can select any dispensing system 262 of multiple dispensing systems 262, the image captured by the dispensing system 262 is provided to the point-of-verification device 260, which provides a confirmation as to whether the good should be provided to the customer. For example, the point-of-verification device 260 can determine (e.g., using the facial recognition system) whether the customer attempting to retrieve the good is a customer that was verified at the point-of-verification device 260.

In some implementations, a good can be preemptively prepared for retrieval by a customer based on the customer's proximity to the retrieval location. For example, in the case of the example architecture 200' of FIG. 2B, which includes the point-of-verification device 260 and one or more dispensing systems 262, the good can be prepared for retrieval in response to determining that the customer is proximate to a dispensing system 262. For example, images of faces of customers in line to retrieve goods from the dispensing system 262 can be captured and it can be determined that a customer has already been verified by the point-of-verification device 260. In response, the good (e.g., beverage) can be prepared (e.g., poured), such that, when the customer arrives at the dispensing system 262, the good is available for immediate pick-up (e.g., the customer does not have to wait, or only has to wait a relatively short time to take the good). For example, the dispensing system 262 can evaluate customers Y deep in a line (e.g., 3 customers deep in a line of customers) to continuously update a dispensing queue for the goods. By the time the $Y^{th}$ customer is at the dispensing system 262, the good for the particular customer is either already prepared for pick-up (e.g., the beverage is already poured), or preparation for pick-up is already underway (e.g., pouring of the beverage has already begun).

In some implementations, a customer can place an order remotely before verification of characteristics of the customer. In some examples, a customer can use a device (e.g., tablet, smartphone) that executes an application (e.g., mobile application (mobile app)) that enables the customer to place an order for a good that is to be retrieved. In some examples, the customer is also able to pay for the order using the application. After ordering remotely, the customer can approach a vending machine 202 of FIG. 2A, or a point-of-verification system 260 of FIG. 2B for characteristic verification to be performed, as described herein. In some examples, upon arriving at the vending machine 202 of FIG. 2A, or the point-of-verification system 260 of FIG. 2B the customer can present evidence of the order, and the vending machine 202, or the point-of-verification system 260 can retrieve details of the order based on the evidence. Example evidence can include, without limitation, a machine-readable code (e.g., a bar code, a QR code) that can be generated by the application of the device of the customer and displayed to a camera and/or scanner of the vending machine 202, or the point-of-verification system 260. The vending machine 202, or the point-of-verification system 260 can decode the machine-readable code to determine the details of the order, and commence verification of the customer, as described herein.

Figure 3:
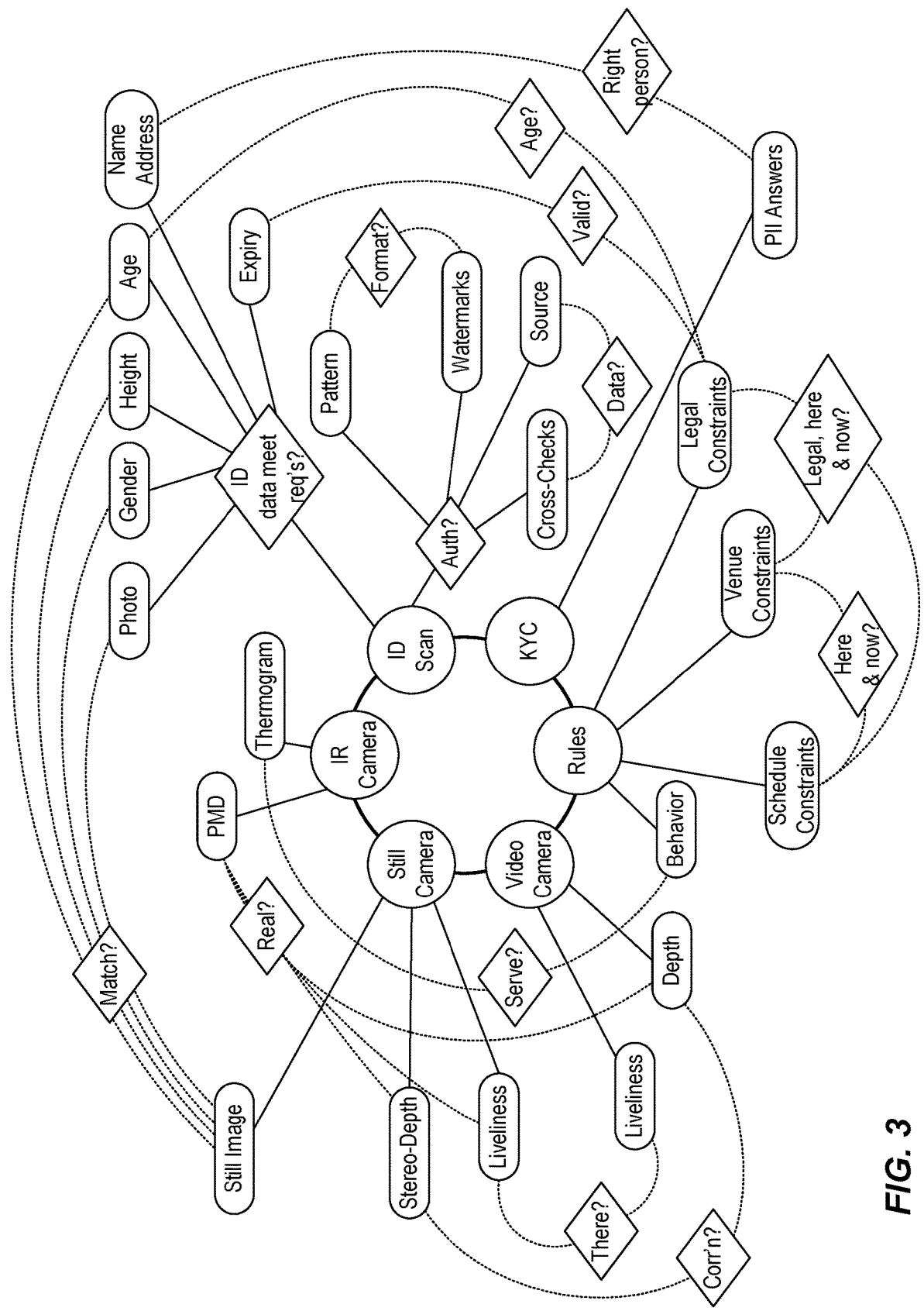
FIG. 3 depicts an example conceptual diagram in accordance with implementations of the present disclosure.

FIG. 3 depicts an example conceptual diagram 300 in accordance with implementations of the present disclosure. The example conceptual diagram 300 represents a so-called web of proof to determine whether a consumer is to be served. The example conceptual diagram 300 includes circles indicating devices and/or data (e.g., IR camera still camera, video camera (which can be individual or combined cameras), ID scanner, know-your-client (KYC) data (e.g., answers providing personally identifiable information (PII)), and sets of rules to be applied) on the vending machine (e.g., the vending machine 100 of FIG. 1, the vending machine 202 of FIG. 2A). The example conceptual diagram 300 includes ovals indicating data and/or sources of data that can be processed, as described herein. The example conceptual diagram 300 includes diamonds indicating one or more determinations that are to be made to ultimately determine whether a consumer is to be served.

In the example of FIG. 3, an example determination can be whether the consumer is actually present at the vending machine (diamond→There?). In some examples, this can be determined based on images and/or video from the still camera and the video camera, respectively (e.g., images depicting liveliness, such as movement of a consumer present at the vending machine). Another example determination can be whether the consumer as presented at the vending machine is real (diamond→Real?). In some examples, this can be determined based on one or more depths (including a projected matrix depth (PMD) and liveliness. In this manner, the vending machine cannot be spoofed by a consumer holding up a picture of another in front of the vending machine. In some examples, multiple depths are determined, and it is determined whether the depths correlate to one another (diamond→Corr'n (correlation)).

Although there is a multiplicity of each of devices and/or data (circles), data and/or sources of data (ovals), and determinations (diamonds), it is contemplated that sub-sets of each can be used in accordance with implementations of the present disclosure. In some implementations, all can be used. For example, whether a consumer is to be served can be determined based on the identification being unexpired, the age indicated on the identification being of the legal age, and the consumer matching the identification. As another example, whether a consumer is to be served can be determined based on an observed consumer at the vending machine being real (e.g., not spoofed using an image of a person; liveliness), the identification being unexpired, the age indicated on the identification being of the legal age, and the consumer matching the identification. As another example, whether a consumer is to be served can be determined based on a state of the consumer at the vending machine (e.g., sober, drunk), the identification being unexpired, the age indicated on the identification being of the legal age, and the consumer matching the identification. As another example, whether a consumer is to be served can be determined based on any venue constraints, the identification being unexpired, the age indicated on the identification being of the legal age, and the consumer matching the identification. As another example, whether a consumer is to be served can be determined based on authenticity of the identification, the identification being unexpired, the age indicated on the identification being of the legal age, and the consumer matching the identification. In general, any appropriate combination of the above criteria for determining whether a consumer is to be served can be used.

Figure 4B:
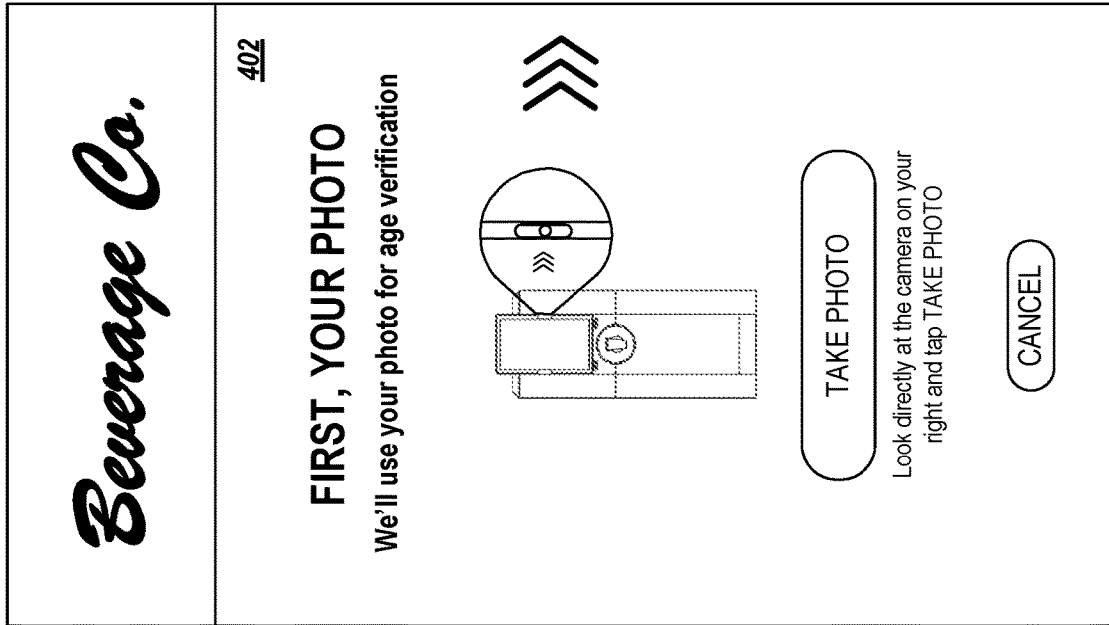
FIGS. 4A-4F depict example user interfaces in accordance with implementations of the present disclosure.
Figure 4A:
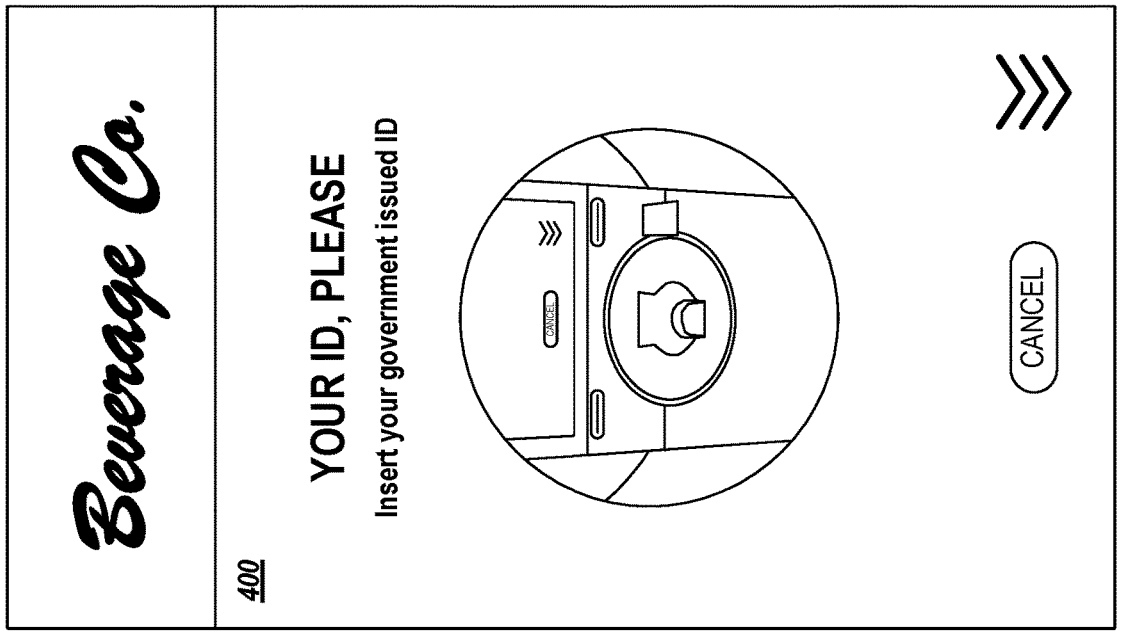

FIGS. 4A-4F depict example user interfaces (UIs) in accordance with implementations of the present disclosure. The example UIs can be displayed in the display screen 108 of the vending machine 100. FIG. 4A depicts an example UI 400 depicting instructions for a consumer to insert an identification. The example UI 400 includes a partial image of the vending machine (e.g., the vending machine 100 of FIG. 1), which enables the consumer to orient themselves with respect to the vending machine. The example UI 400 also includes an arrow pointing to the ID scanner that is to be used to scan the identification. In this manner, the consumer is aware of which device to use to scan the identification. FIG. 4B depicts an example UI 402 depicting instructions for a consumer to have a photo (e.g., digital image) taken. The example UI 402 includes an image of the vending machine (e.g., the vending machine 100 of FIG. 1), which enables the consumer to orient themselves with respect to the vending machine. The example UI 402 also includes an arrow pointing to the camera that is to be used to capture the photo. In some examples, the UI 400 is displayed before the UI 402. In some examples, the UI 402 is displayed before the UI 400. In some examples, one or more initial UIs are displayed prior to display of either the UI 400 or the UI 402. For example, an introduction UI and/or beverages selection UIs can be displayed prior to display of either the UI 400 or the UI 402.

Figure 4D:
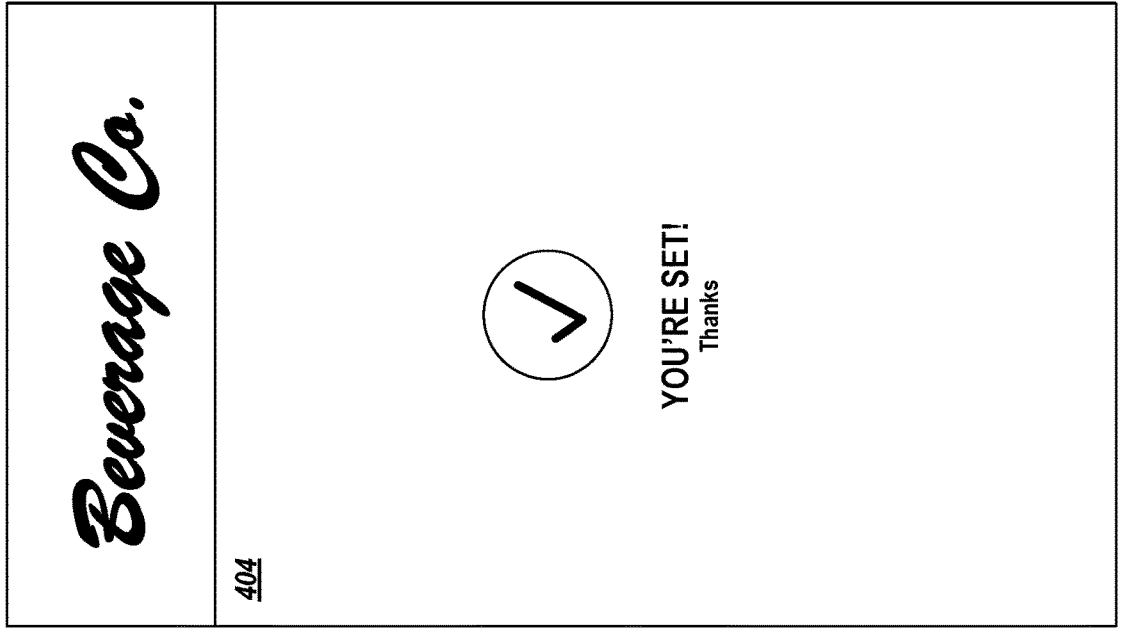
Figure 4C:
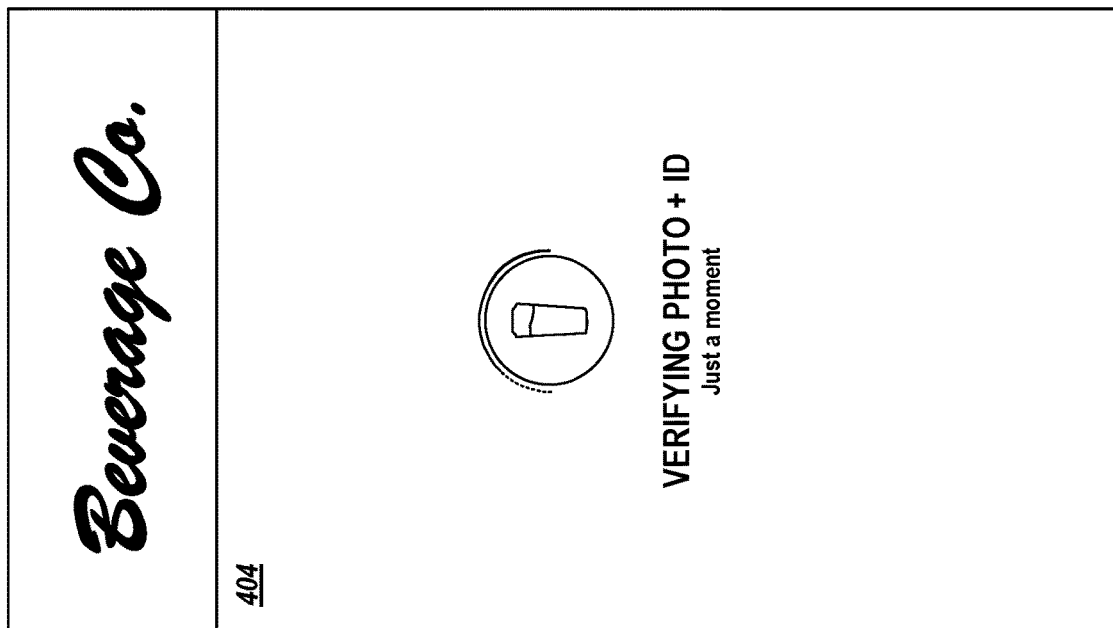

FIG. 4C depicts an example UI 404 that provides a wait icon. The UI 404 functions as a wait screen, while it is being determined whether the consumer is to be served.

FIG. 4D depicts an example UI 406 that provides a result. In some examples, the UI 406 informs the user that their identification has been accepted and the beverage will be served. In some examples, the UI 406 is temporarily displayed and automatically changes to one or more UIs instructing on the service process (e.g., when and where to insert vessel).

Figure 4E:
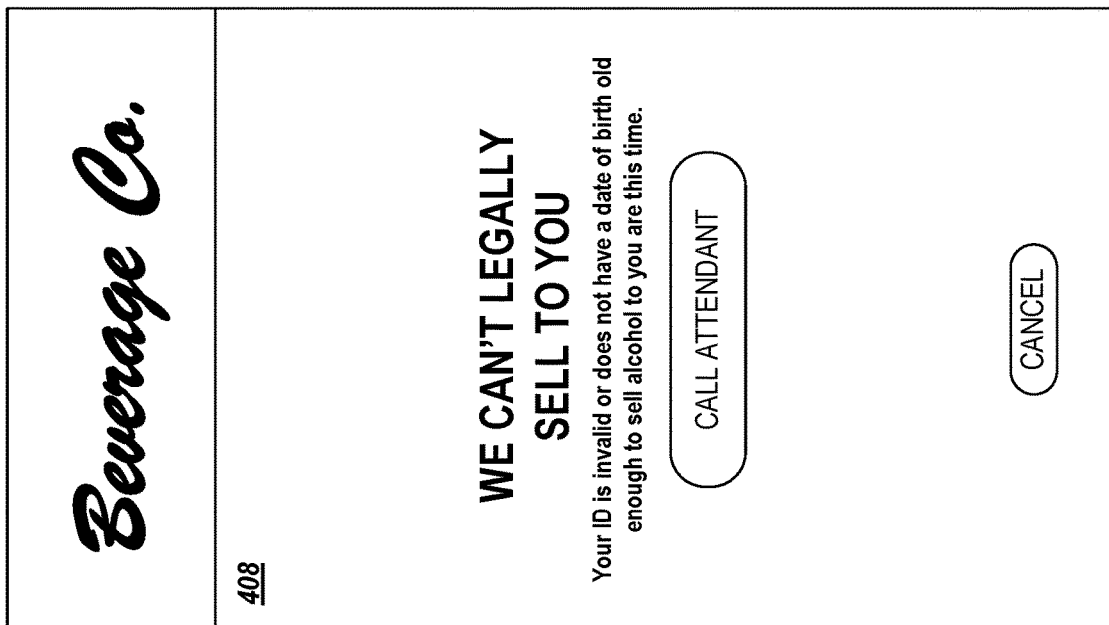
Figure 4F:
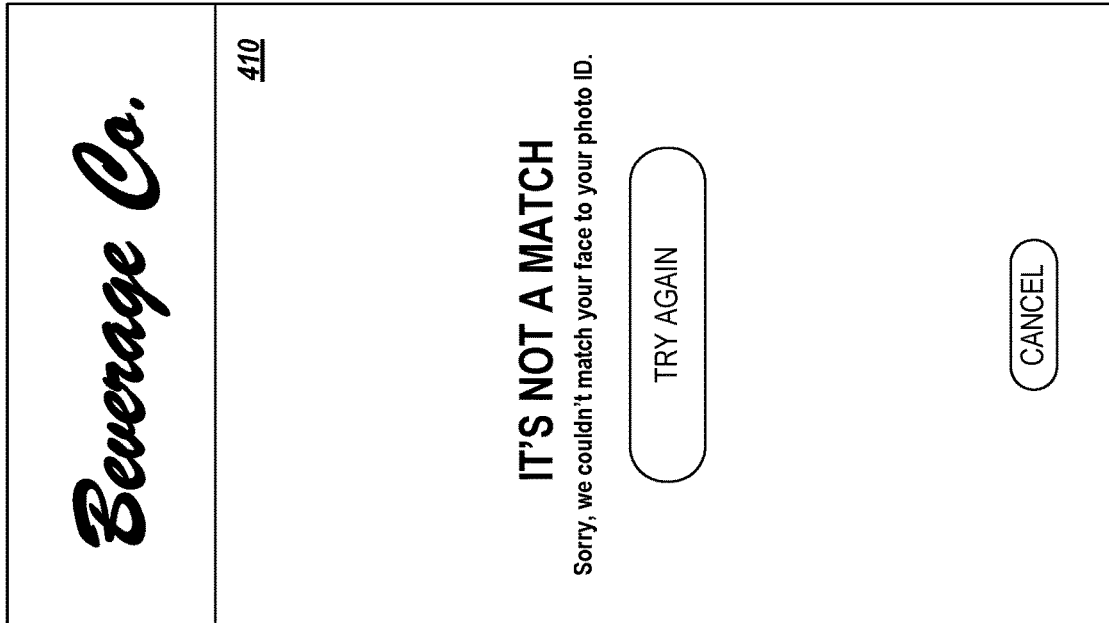

FIG. 4E depicts an example UI 408 to inform the consumer that they cannot be served. The UI 408 reflects a denial of service based on either an invalid identification or an age that is not of the legal age. FIG. 4F depicts an example UI 410 to inform the consumer that they cannot be served. The UI 410 reflects a denial of service based on the consumer not matching the identification (e.g., a determination that the consumer is not authentic).

In some implementations, one or more UIs can present personalized menus based on one or more of demographics of the customer and preferences of the customer. For example, and as described above, a demographic of the customer can be determined. In some examples, a menu displayed to the customer can be tailored based on the demographic. For example, for a first demographic a first set of products is displayed, and, for a second demographic, a second set of products is displayed. In some examples, for the first demographic, the first set of products and the second set of products are both displayed, but the first set of products is displayed more prominently than the second set of products (e.g., toward the top of the UI with larger graphical representations). In some examples, for the second demographic, the first set of products and the second set of products are both displayed, but the second set of products is displayed more prominently than the first set of products (e.g., toward the top of the UI with larger graphical representations).

In some examples, the service history for a particular customer can be provided, as described herein, a menu displayed to the customer can be tailored based on the service history. For example, frequencies of purchases of respective goods can be determined, and more frequently purchased goods can be displayed more prominently than less frequently purchased goods. In some examples, if a frequency of purchase of a good is below a threshold frequency, the good is not initially displayed to the customer. For example, if the customer frequently purchases lagers, less frequently purchases stouts, and has never purchased a wheat beer, available lagers can be displayed more prominently in the UI than available stouts, and available wheat beers are not initially displayed.

Figure 5:
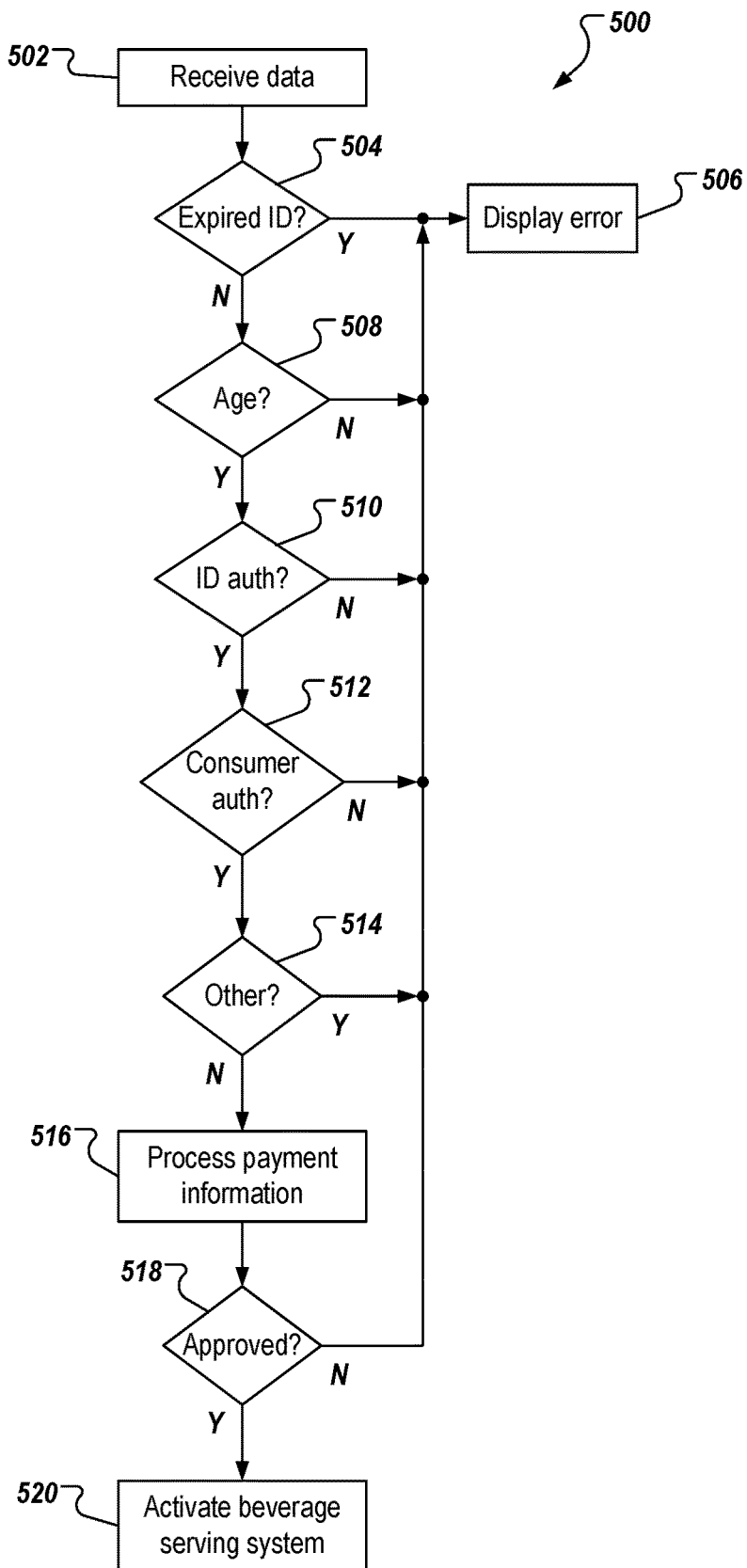
FIG. 5 depicts an example process in accordance with implementations of the present disclosure.

FIG. 5 depicts an example process 500 that can be executed in implementations of the present disclosure. In some examples, the example process 500 is provided using one or more computer-executable programs executed by one or more computing devices.

Data is received (502). For example, data representative of the consumer, who is present at the vending machine and is requesting service can be received from the one or more cameras. As another example, consumer-specific information and ID-specific information can be received from an identification (e.g., scanned by an ID scanner). It is determined whether the identification is expired (504). For example, an expiration data provided on the identification is compared to a current date. If the identification is expired, an error is displayed (506). For example, the error can indicate that the identification is expired, and the consumer will not be served.

If the identification is not expired, it is determined whether age provided by the identification is of legal age (508). For example, the DOB provided on the identification is compared to a current data. If the age provided by the identification is not of legal age, an error is displayed (506). For example, the error can indicate that the consumer is not of legal age for service. If the age provided by the identification is of legal age, it is determined whether the identification is authentic (510). If the identification is not authentic, an error is displayed (506). For example, the error can indicate that the identification is not acceptable, and the consumer will not be served.

If the identification is authentic, it is determined whether the consumer is authentic (512). If the consumer is not authentic, an error is displayed (506). For example, the error can indicate that the consumer does not match the identification, and the consumer will not be served. If the consumer is authentic, it is determined whether any other condition is present that would prohibit service of the beverage (514). For example, any schedule constraints, any venue constraints, and/or any legal constraints can be evaluated to determine whether any other condition is present that would prohibit service of the beverage. If another condition is present that would prohibit service of the beverage, an error is displayed (506). For example, the error can indicate the reason that service is declined (e.g., "There is currently a collegiate sporting event taking place at the stadium, during which we are unable to serve alcohol." or "It is Sunday morning, and we are unable to serve alcohol until 12 Noon.").

If no other condition is present that would prohibit service of the beverage, payment information is processed (516). It is determined whether the payment is approved (518). If the payment is not approved, an error is displayed (506). If the payment is approved, the beverage serving system is activated to serve the beverage (520).

While the example process 500 of FIG. 5 is comprehensive, it is contemplated that the entirety of the example process 500 need not be performed to determine whether to serve a consumer. For example, and as described herein, any appropriate sub-set of determinations of the example process 500 can be executed (e.g., whether a consumer is to be served can be determined based on the identification being unexpired, the age indicated on the identification being of the legal age, and the consumer matching the identification).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for selectively serving a consumer from a vending machine, the method comprising:
receiving consumer-specific data and ID-specific data from an identification presented by a consumer to a vending machine, the consumer-specific data being absent personally identifiable information (PII), such that PII of the consumer is absent from storage within the vending machine and is absent from transmissions from the vending machine;
processing at least a portion of the ID-specific data to determine an expiration date of the identification; and
determining that the identification is unexpired based on the expiration date, and in response:
processing at least a portion of the ID-specific data to determine a birthdate of an individual represented by the identification, and
determining that an age of the individual meets a threshold age, and in response:
processing at least a portion of the ID-specific data based on a type of the identification to determine whether the identification is authentic, and
serving the consumer from the vending machine at least partially in response to determining that the identification is authentic and determining that the consumer is authentic relative to the identification.

2. The method of claim 1, wherein determining whether the identification is authentic comprises comparing features of the identification to known features of the type of the identification.

3. The method of claim 1, wherein determining whether the identification is authentic comprises providing an image of the identification to a machine learning (ML) model and receiving an indication from the ML, model indicating whether the identification is authentic.

4. The method of claim 1, wherein determining whether the consumer is authentic relative to the identification comprises providing image data and/or video data depicting the consumer and an image from the identification to a facial recognition system that processes the data to determine whether the consumer matches the image provided with the identification.

5. The method of claim 1, further comprising determining a state of the consumer, serving the consumer being further in response to the state of the user.

6. The method of claim 1, further comprising determining that a person is physically present at the vending machine, serving the consumer being further in response to determining that a person is physically present at the vending machine.

7. The method of claim 6, wherein determining that a person is physically present is at least partially based on a depth determined using one or more images generated by at least one camera of the vending machine.

8. A system, comprising:
a beverage dispenser; and
a computer-readable storage device coupled to the one or more processors and having instructions stored thereon which, when executed by the one or more processors, cause the one or more processors to perform operations for selectively serving a consumer from a vending machine, the operations comprising:
receiving consumer-specific data and ID-specific data from an identification presented by a consumer to a vending machine, the consumer-specific data being absent personally identifiable information (PII), such that PII of the consumer is absent from storage within the vending machine and is absent from transmissions from the vending machine;
processing at least a portion of the ID-specific data to determine an expiration date of the identification; and
determining that the identification is unexpired based on the expiration date, and at least partially in response:
processing at least a portion of the ID-specific data to determine a birthdate of an individual represented by the identification, and
determining that an age of the individual meets a threshold age, and in response:
processing at least a portion of the ID-specific data based on a type of the identification to determine whether the identification is authentic, and
serving the consumer from the vending machine at least partially in response to determining that the identification is authentic and determining that the consumer is authentic relative to the identification.

9. The system of claim 8, wherein determining whether the identification is authentic comprises comparing features of the identification to known features of the type of the identification.

10. The system of claim 8, wherein determining whether the identification is authentic comprises providing an image of the identification to a machine learning (ML) model and receiving an indication from the ML, model indicating whether the identification is authentic.

11. The system of claim 8, wherein determining whether the consumer is authentic relative to the identification comprises providing image data and/or video data depicting the consumer and an image from the identification to a facial recognition system that processes the data to determine whether the consumer matches the image provided with the identification.

12. The system of claim 8, wherein operations further comprise determining a state of the consumer, serving the consumer being further in response to the state of the user.

13. The system of claim 8, wherein operations further comprise determining that a person is physically present at the vending machine, serving the consumer being further in response to determining that a person is physically present at the vending machine.

14. Non-transitory computer-readable storage media coupled to one or more processors and having instructions stored thereon which, when executed by the one or more processors, cause the one or more processors to perform operations for selectively serving a consumer from a vending machine, the operations comprising:
receiving consumer-specific data and ID-specific data from an identification presented by a consumer to a vending machine, the consumer-specific data being absent personally identifiable information (PII), such that PII of the consumer is absent from storage within the vending machine and is absent from transmissions from the vending machine;
processing at least a portion of the ID-specific data to determine an expiration date of the identification; and
determining that the identification is unexpired based on the expiration date, and at least partially in response:
processing at least a portion of the ID-specific data to determine a birthdate of an individual represented by the identification, and determining that an age of the individual meets a threshold age, and in response:
processing at least a portion of the ID-specific data based on a type of the identification to determine whether the identification is authentic, and
serving the consumer from the vending machine at least partially in response to determining that the identification is authentic and determining that the consumer is authentic relative to the identification.

15. The non-transitory computer-readable storage media of claim 14, wherein determining whether the identification is authentic comprises comparing features of the identification to known features of the type of the identification.

16. The non-transitory computer-readable storage media of claim 14, wherein determining whether the identification is authentic comprises providing an image of the identification to a machine learning (ML) model and receiving an indication from the ML model indicating whether the identification is authentic.

17. The non-transitory computer-readable storage media of claim 14, wherein determining whether the consumer is authentic relative to the identification comprises providing image data and/or video data depicting the consumer and an image from the identification to a facial recognition system that processes the data to determine whether the consumer matches the image provided with the identification.

* * * * *